Patented Oct. 20, 1931

1,827,824

UNITED STATES PATENT OFFICE

EMIL E. NOVOTNY AND WILMOTT W. JOHNSON, OF PHILADELPHIA, PENNSYLVANIA, ASSIGNORS TO JOHN STOGDELL STOKES, OF HUNTINGDON VALLEY P. O., PENNSYLVANIA

FURFURAL-UREA RESIN AND PROCESS OF MAKING THE SAME

No Drawing.　　　Application filed October 1, 1924. Serial No. 741,058.

This invention relates to the manufacture of condensation products of urea and the like and furfural and the like, resulting in the production of useful resins or rubberlike products of a plastic, potentially reactive nature. These products may subsequently be shaped, molded and hardened as through the action of heat or heat and pressure. They are therefore useful plastic, cementitious substances which may be soluble in the usual resin-like solvents such as alcohol, acetone, etc.

Furthermore, these condensation products of urea and furfural may be considerably altered as by the introduction of various solid or liquid modifying agents and fillers such as, for instance, wood flour, comminuted corn cobs, infusorial earth, asbestos, metallic oxides, or camphor, stearic acid, lanolin, China wood oil, etc. When so mixed the characteristics of the product can be considerably altered, as shrinkage stresses can be modified and certain of the lubricants or bodies of a liquid or semi-solid nature will very greatly tend to eliminate brittleness.

The soluble product is most particularly useful as a varnish for impregnation into various sheetlike or open structures such as paper, cloth, asbestos, etc. After the solvent has been evaporated, these structures may be molded into many desired shapes, and when so formed under the combined action of heat and pressure, reaction takes place in situ, resulting in products of an infusible nature which are not readily affected by ordinary solvents and are of great mechanical and dielectric strength.

We have found that under certain conditions of temperature, urea and furfural will readily condense, forming products of a diverse nature; for instance, the two products will readily condense upon being heated to a temperature of 240° F. The reaction at this temperature is extremely energetic and is difficult to control even in glassware, with the result that the usual end product is an amorphous powdery mass which does not have resin or rubberlike characteristics so desirable for plastic molding purposes. If the urea and furfural, on the other hand, are combined by being heated to a temperature of 240° F. in the presence of an acid or acid salt catalyst such as, for example, hydrochloric and sulphuric acids, and iron and antimonic chlorides, the reaction is not so energetic when being brought to this temperature and a plastic mass more resinous in character is obtained after steam distillation, preferably under vacuum. This product, however, if reacted for too long a time at this temperature likewise becomes amorphous and powdery. However, the reaction mass may be more readily controlled. This material, unlike that made without a catalyst, may be brought to an infusible point by prolonged heating with or without the addition of a small percentage of an active methylene body.

We have found, however, that the ideal reaction product of urea and furfural is produced in the presence of a small quantity of basic material as a catalyst, such as, for example, ammonia or sodium carbonate, and upon the mass reaching a temperature of 280° F. under a reflux condenser, the reaction becomes exothermic and proceeds along gently so that it may be readily controlled, and in less than two hours' time the reaction may be stopped. The reflux condenser may now be inverted and the synthetic water formed together with any uncombined material formed may be readily distilled off, resulting in a resinous product which is readily soluble in alcohol, acetone and ether, and insoluble in benzol and water. Upon prolonged heating, this soluble mass becomes rubbery and then infusible. High temperatures speed up the reaction considerably, and it is therefore desirable, when molding, to heat these plastic products at temperatures somewhat below their point of carbonization. It has been found that other aldehydes have a desirable effect in producing a strong, tough, final product, and therefore it is desirable to introduce or combine with the primary reaction products other aldehyde bodies, the preference, however, being for bodies having active methylene groups such as formaldehyde, paraformaldehyde, formaldehydeaniline, and hexamethylenetetramin. These bodies have a marked accelerating effect on the final reaction and are therefore desirable from an economical standpoint.

In order that the invention may be better understood, the following specific examples are given:

Place in a suitable digester provided with mechanical agitation and a condenser for refluxing and distilling, 100 pounds of urea, 300 pounds of furfural, and 4 pounds of 26% aqueous ammonia. Arrange condenser for refluxing and heat materials to a temperature of 220° F. for two hours. At the end of this period, arranged condenser for distillation and distill off excess materials and synthetic water. Distillation commences at about 220° F., and the temperature may be raised gradually until 317° F. has been reached. However, great care must be exercised not to exceed this temperature inasmuch as the mass will go to infusibility rapidly at temperatures higher than this.

It appears that this reaction between urea and furfural as above given takes place in equimolecular proportions and that, therefore, larger quantities of furfural than those given may be used, but in the end, after distillation, the proportion of combined materials will be substantially the same.

In place of using aqueous ammonia as a condensing agent, we can use potassium or sodium carbonate, sodium hydroxide, potassium hydroxide and other basic materials.

In our experiments where potassium carbonate was used as a catalyst, it was used in its dry form in a weight equivalent to one per cent of the total weight of the charge of urea and furfural. Similarly sodium carbonate was also used dry and in the same proportion. The hydroxides of sodium and potassium were first dissolved in water to a 20% strength, and this solution was added to the reacting mass at the rate of 3% of the total weight of urea and furfural.

It is to be understood that acids such as, for example, hydrochloric and sulphuric, acid salts such as, for example, ammonium and iron chloride, will cause the reaction to ensue and that these, we have found, may be used in proportions of about one per cent of the weight of the urea and furfural under reaction.

We have also found it desirable to introduce China wood oil, lanolin and other modifying agents before mentioned preferably into the reacting mass although for some purposes these modifying agents may be added to the product after the primary reaction has terminated. When China wood oil, for instance, is used, we find that a percentage of say 5% of the weight of urea and furfural produces a mass which is much more flexible than when the China wood oil is not used. A similar proportion of lanolin may be added to the mass after the reaction has been completed and is, say, in its varnish form. This mass produces a product having a lubricant uniformly dispersed throughout and which is therefore admirably suited for cold punching, etc.

Wherein we have used the term urea, we wish this to be understood as including not only the substance commonly known as urea or carbamid, but the various derivatives such as benzoyl carbamid, and acetyl carbamid, thiourea. And wherein we have used the term furfural, we wish it to be understood as including its homologues, derivatives and substitution products such as, for example, methylfurfural.

What we claim is—

1. The herein described product comprising a plastic resinous condensation product of furfural and urea.

2. The herein described product comprising a fusible resinous condensation product resulting from the reaction of furfural and urea in the presence of a catalytic agent.

3. A new composition of matter comprising a resinous, fusible condensation product of furfural and urea, and a hardening agent, said composition being convertible by heating into a hard infusible body.

4. A new composition of matter comprising a resinous, potentially reactive fusible condensation product resulting from the reaction of furfural and urea in the presence of a catalytic agent, and a hardening agent incorporated with the fusible condensation product, said composition being convertible by heat into a hard infusible body.

5. The herein described product comprising a potentially reactive fusible condensation product formed by the reaction of furfural with urea.

6. A potentially reactive composition comprising a fusible condensation product of furfural and urea and a hardening agent comprising a methylene-containing body, said composition being convertible by heat into a hard insoluble and infusible body.

7. The herein described product comprising a potentially reactive fusible resin produced by the reaction of furfural and urea in the presence of an acid catalyst.

8. The herein described product comprising a resinous reaction material resulting from the reaction of furfural and urea in the presence of a basic catalyst.

9. The herein described method which comprises heating a mixture of furfural and urea in the presence of a basic catalyst to convert said mixture into a potentially reactive fusible resinous condensation product.

10. The herein described method of making a synthetic resinous plastic which comprises heating a mixture of furfural and urea in the presence of a basic catalyst to cause a reaction between such ingredients, and stopping the reaction when the mixture has assumed a plastic state.

11. The herein described method of forming a synthetic resinous plastic comprising heating a mixture of furfural and urea in the presence of a basic catalyst, to a temperature in the range of 220° F. or above, until the urea and furfural have reacted to produce a fusible potentially reactive resin.

12. The herein described method of forming a synthetic resinous plastic comprising heating a mixture of furfural and urea in the presence of a basic catalyst, to a temperature in the range of 220° F. or above, until the urea and furfural have been substantially combined to form a resinous reaction product, and removing from said reaction product synthetic water and other volatile substances.

13. The herein described method which comprises heating a mixture of furfural and urea in the presence of a basic catalytic agent to produce a fusible potentially reactive condensation product and subsequently subjecting said condensation product to further heat to convert the same into a hard infusible body.

14. The herein described method which comprises heating a mixture of furfural and urea and a basic catalyst to produce a potentially reactive fusible resin, adding a hardening agent thereto, and then further heating the product to produce a hard infusible body.

15. The herein described method of forming a synthetic resinous plastic comprising heating a mixture of furfural and urea to a temperature in the range of 220° F. or above, until the urea and furfural have reacted to produce a potentially reactive fusible resinous condensation product.

16. The herein described method of making a synthetic resinous plastic which comprises heating a mixture of furfural and urea with furfural in excess of urea to cause a reaction between such ingredients, and stopping the reaction when the mixture has assumed a plastic state.

17. The herein described method of forming a synthetic resinous plastic comprising heating a mixture of furfural and urea to a temperature in the range of 220° F. or above, until the urea and furfural have been substantially combined to form a resinous reaction product, and removing from said reaction product synthetic water and other volatile substances.

18. The herein described method of forming a synthetic resinous plastic comprising heating a mixture of furfural and urea in the presence of an acid catalyst, to a temperature in the range of 220° F. or above, until the urea and furfural have reacted to produce a fusible potentially reactive resin.

19. The herein described method of forming a synthetic resinous plastic comprising heating a mixture of furfural and urea in the presence of a basic catalyst, to a temperature in the range of 220° F. or above, until the urea and furfural have reacted to produce a fusible potentially reactive resin, and subsequently subjecting said resinous reaction product to further heat in order to convert the same into a hard infusible body.

Signed at Philadelphia in the county of Philadelphia and State of Pennsylvania this 30th day of September, A. D. 1924.

EMIL E. NOVOTNY.
WILMOTT W. JOHNSON.